(12) United States Patent
Mizuno et al.

(10) Patent No.: US 7,989,753 B2
(45) Date of Patent: Aug. 2, 2011

(54) PHOTODETECTOR HAVING WIDE DYNAMIC RANGE AND LOW TEMPERATURE DEPENDENCE

(75) Inventors: Seiichiro Mizuno, Hamamatsu (JP); Haruhiro Funakoshi, Hamamatsu (JP); Tetsuya Taka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 653 days.

(21) Appl. No.: 10/593,084

(22) PCT Filed: Mar. 17, 2005

(86) PCT No.: PCT/JP2005/004760
§ 371 (c)(1),
(2), (4) Date: May 8, 2008

(87) PCT Pub. No.: WO2005/090935
PCT Pub. Date: Sep. 29, 2005

(65) Prior Publication Data
US 2009/0152446 A1    Jun. 18, 2009

(30) Foreign Application Priority Data

Mar. 18, 2004 (JP) ................. P2004-078562

(51) Int. Cl.
    *H01J 40/14* (2006.01)
(52) U.S. Cl. ......... 250/214 R; 250/214 A; 250/214 LA; 250/208.1
(58) Field of Classification Search ............. 250/214 R, 250/214 A, 214 LA, 208.1, 208.2
See application file for complete search history.

(56) References Cited

U.S. PATENT DOCUMENTS

| 6,642,501 B2 * | 11/2003 | Mizuno et al. ............. 250/214 R |
| 2002/0029122 A1 | 3/2002 | Mizuno ........................ 702/107 |
| 2004/0169128 A1 | 9/2004 | Mizuno ........................ 250/214 |

FOREIGN PATENT DOCUMENTS

| CN | 2432569 | 5/2001 |
| EP | 1 197 735 | 4/2002 |
| EP | 1 408 315 | 4/2004 |
| JP | 5-219443 | 8/1993 |
| JP | 11-155105 | 6/1999 |
| JP | 2000-310561 | 11/2000 |

(Continued)

*Primary Examiner* — Seung C Sohn
(74) *Attorney, Agent, or Firm* — Drinker Biddle & Reath LLP (57) ABSTRACT

A photodetector of a wide dynamic range of incident light amount detection and low temperature dependence is provided. A first signal processing unit $10_{m,n}$ includes an integrating circuit 11, a first holding circuit 12, a comparing circuit 13, a second holding circuit 14, and a latching circuit 15. The integrating circuit 11 has a variable capacitor unit that is selectively set to a capacitance value among a plurality of capacitance values, accumulates charges, output from the photodiode, into the variable capacitor unit over an accumulating period that is in accordance with the capacitance value set at the variable capacitor unit, and outputs a voltage $V_1$ that is in accordance with the amount of the accumulated charges. The comparing circuit 13 inputs the voltage $V_1$ output from the integrating circuit 11, performs a quantitative comparison of the voltage $V_1$ with a reference voltage $V_{ref}$, outputs a compared signal $S_3$ expressing the result of comparison, and, when the voltage $V_1$ output from the integrating circuit 11 at the end of an accumulating period is less than the reference voltage $V_{ref}$, instructs the first holding circuit 12 to hold the voltage.

8 Claims, 8 Drawing Sheets

FOREIGN PATENT DOCUMENTS

| | | |
|---|---|---|
| JP | 2001-036128 | 2/2001 |
| JP | 2003-004529 | 1/2003 |
| TW | 336275 | 7/1998 |
| TW | 569005 | 1/2004 |
| WO | WO 00/65317 | 11/2000 |
| WO | WO 02/103308 | 12/2002 |

* cited by examiner

PHOTODETECTOR HAVING WIDE DYNAMIC RANGE AND LOW TEMPERATURE DEPENDENCE

TECHNICAL FIELD

The present invention relates to a photodetector.

BACKGROUND ART

Among photodetectors, there are known types in which current signals, generated by photodiodes according to incident light amounts, are logarithmically compressed and output as voltage signals (see, for example, Patent Document 1 and Patent Document 2). This type of photodetector has a merit of being wide in the dynamic range of incident light amount detection.

Patent Document 1: Japanese Published Unexamined Patent Application No. Hei 11-155105
Patent Document 2: Japanese Published Unexamined Patent Application No. Hei 5-219443

However, a photodetector that employs such a logarithmic compression method has a problem that the logarithm compression characteristics (that is, the incident light amount detection characteristics) vary largely with temperature.

The present invention has been made to resolve the above problem and an object thereof is to provide a photodetector with a wide dynamic range of incident light amount detection and a small temperature dependence.

DISCLOSURE OF THE INVENTION

A photodetector according to the present invention includes: (1) a photodiode, generating charges of an amount that is in accordance with an incident light amount; (2) an integrating circuit, having a variable capacitor unit that is selectively set to a capacitance value $C_n$ among K capacitance values $C_1$ to $C_K$, accumulating charges, output from the photodiode, into the variable capacitor unit over an accumulating period $T_k$ that is in accordance with a capacitance value $C_k$ set in the variable capacitor unit, and outputting a voltage according to the amount of the accumulated charges; (3) a first holding circuit, holding the voltage output from the integrating circuit at the end of an accumulating period $T_k$ among accumulating periods $T_1$ to $T_K$ and outputting the held voltage; and (4) a comparing circuit, inputting the voltage output from the integrating circuit or the first holding circuit, performing a quantitative comparison of the input voltage with a reference voltage, outputting a compared signal expressing the result of comparison, and, when the voltage output from the integrating circuit or the first holding circuit at the end of an accumulating period $T_k$ is less than the reference voltage, instructing the first holding circuit to hold the voltage.

The photodetector is also characterized in that the value of a ratio, $(T_k/C_k)$, differs according to the value of k. Preferably, a ratio of a ratio $(T_{k1}/C_{k1})$ with respect to a ratio $(T_{k2}/C_{k2})$ is a power of 2. Here, K is an integer no less than 2, each of k, k1, and k2 is an arbitrary integer no less than 1 and no more than K, and k1 and k2 differ from each other.

With this photodetector, the variable capacitor unit of the integrating circuit is selectively set to a capacitance value $C_n$ among K capacitance values $C_1$ to $C_K$. Charges output from the photodiode are accumulated into the variable capacitor unit over the accumulating period $T_k$ that is in accordance with the capacitance value $C_k$ set in the variable capacitor unit, and a voltage is output from the integrating circuit according to the amount of the accumulated charge.

The first holding circuit holds the voltage output from the integrating circuit at the end of an accumulating period $T_k$ among accumulating periods $T_1$ to $T_K$ and the held voltage is output from the first holding circuit. The comparing circuit performs quantitative comparison of the voltage output from the integrating circuit or the first holding circuit with the reference voltage and outputs the compared signal expressing the result of comparison.

When the voltage output from the integrating circuit or the first holding circuit at the end of an accumulating period $T_k$ is less than the reference voltage, the voltage held by the first holding circuit is held thereafter as well. Thus by performing predetermined computations based on the voltage, output from the comparing circuit at the end of an accumulating period $T_k$ and held by the first holding circuit, and the compared signal, output from the comparing circuit and expressing the accumulating period $T_k$, the photodetector can perform image pickup over a wide dynamic range.

Preferably with the photodetector according to the present invention, the first holding circuit serves in common as a CDS circuit that inputs the voltage output from the integrating circuit and holds and outputs a voltage that is in accordance with the difference of the voltages that are respectively input at a beginning and an end of the accumulating period $T_k$. When the first holding circuit thus serves in common as a CDS (Correlated Double Sampling) circuit, error due to noise generated during resetting of an amplifier that is included in the integrating circuit (that is, kTC noise) is reduced and the photodetector can obtain more accurate image pickup data.

Preferably, the photodetector according to the present invention further includes (1) a second holding circuit, inputting a voltage output from the first holding circuit, holding the voltage at a specific point in time, and outputting the held voltage, and (2) a latching circuit, inputting a compared signal output from the comparing circuit, storing the compared signal at the specific point in time, and outputting the stored compared signal.

By the provision of the second holding circuit and the latching circuit that respectively holds and stores the data obtained by image pickup, image pickup data can be obtained in the same period in which image pickup data, obtained by the photodiode, the integrating circuit, the first holding circuit, and the comparing circuit in a previous period, are being processed. This photodetector can thus perform high-speed image pickup.

The photodetector according to the present invention preferably further includes an A/D converting circuit, inputting the voltage output from the first holding circuit, converting the input voltage into a digital value, and outputting the digital value. It is furthermore preferable for a bit shifting circuit, which inputs the digital value output from the A/D converting circuit, inputs the compared signal output from the comparing circuit, performs bit shifting of the digital value based on the compared signal, and outputs the bit-shifted digital value, to be included.

It is furthermore preferable for a switched capacitor circuit, which inputs the voltage output from the first holding circuit, holds the voltage in a capacitor unit, and outputs the held voltage to the A/D converting circuit, to be included. In these cases, the image pickup data, obtained by the photodiode, the integrating circuit, the first holding circuit, and the comparing circuit are converted into digital values by the A/D converting circuit. The digital values output from the A/D converting circuit are bit shifted by just the necessary number of bits based on the compared signal by the bit shifting circuit.

The photodetector according to the present invention preferably includes a plurality of sets of the photodiode, the integrating circuit, the first holding circuit, and the comparing circuit and has a single the A/D converting circuit for the plurality of sets. It is furthermore preferable that a plurality of sets of the photodiode, the integrating circuit, the first holding circuit, the comparing circuit, the second holding circuit, and the latching circuit be equipped, and that one set of the switched capacitor circuit, the A/D converting circuit, and the bit shifting circuit be equipped for the plurality of the abovementioned sets.

The photodetector according to the present invention is wide in the dynamic range of incident light amount detection and small in temperature dependence.

DESCRIPTION OF THE SYMBOLS 1 photodetector
10 first signal processing unit
11 integrating circuit
12 first holding circuit
13 comparing circuit
14 second holding circuit
15 latching circuit
20 second signal processing unit
26 switched capacitor circuit
27 A/D converting circuit
28 bit shifting circuit
A amplifier
C capacitor
PD photodiode
SW switch

BEST MODES FOR CARRYING OUT THE INVENTION

A best mode for carrying out the present invention shall now be described in detail with reference to the drawings. In the description of the drawings, elements that are the same shall be provided with the same symbol and redundant description shall be omitted.

Figure 1:
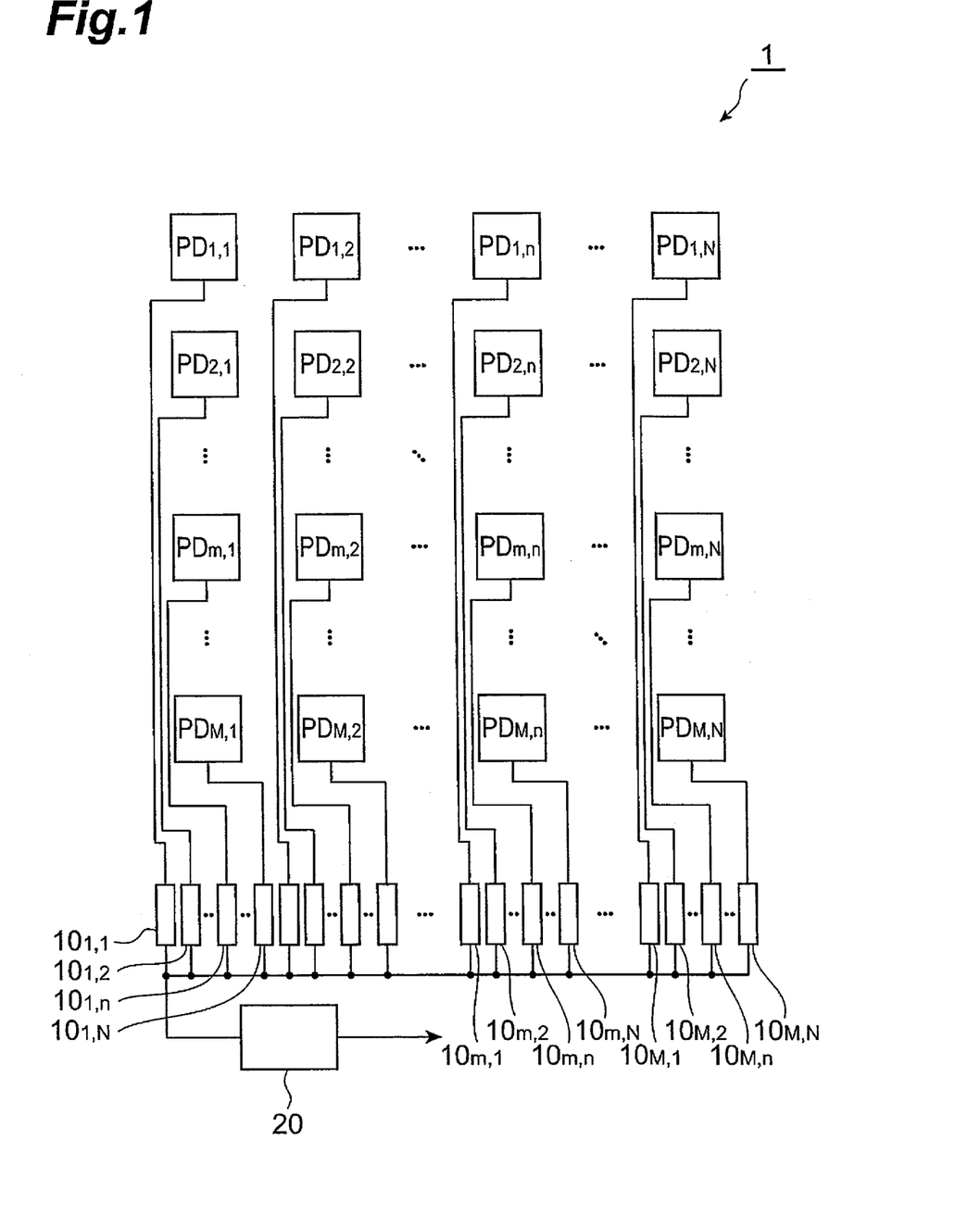
FIG. 1 is a schematic block diagram of a photodetector 1 according to an embodiment.

FIG. 1 is a schematic block diagram of a photodetector 1 according to an embodiment.

The photodetector 1, shown in this FIGURE, has M×N photodiodes $PD_{1,1}$ to $PD_{M,N}$, M×N first signal processing units $10_{1,1}$ to $10_{M,N}$, and a single second signal processing unit 20. As shown in the FIGURE, the M×N photodiodes $PD_{1,1}$ to $PD_{M,N}$ are positioned within a predetermined rectangular area. The M×N first signal processing units, $10_{1,1}$ to $10_{M,N}$ and the single second signal processing unit 20 are positioned outside one side of the abovementioned rectangular region. Each of M and N is an integer no less than 2. In the following, m is an arbitrary integer no less than 1 and no more than M, and n is an arbitrary integer no less than 1 and no more than N.

The M×N photodiodes, $PD_{1,1}$ to $PD_{M,N}$ are arrayed in two dimensions in M rows and N columns. A photodiode $PD_{m,n}$ is positioned at the m-th row and n-th column. Each photodiode $PD_{m,n}$ generates charges of an amount that is in accordance with an incident light amount. Each first signal processing unit $10_{m,n}$ is disposed in one-to-one correspondence to a photodiode $PD_{m,n}$, inputs the charges output from the corresponding photodiode $PD_{m,n}$, and outputs a voltage that is in accordance with the amount of the charges input. The second signal processing unit 20 inputs the voltages that are successively output from the respective M×N first signal processing units $10_{1,1}$ to $10_{M,N}$, converts the voltages (analog values) to digital values, and outputs the digital values.

Figure 2:
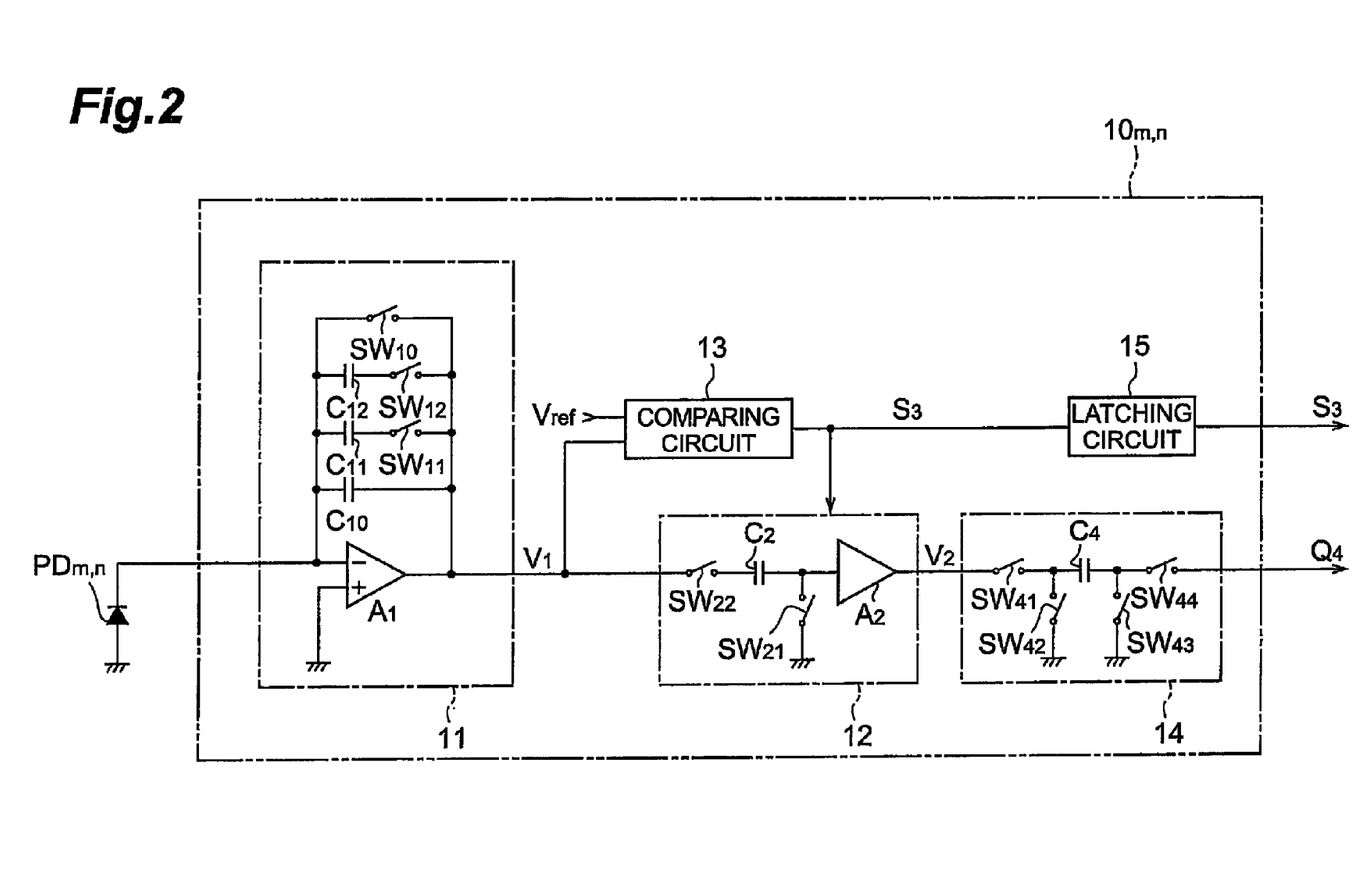
FIG. 2 is a block diagram of a first signal processing unit $10_{m,n}$ of the photodetector 1 according to the embodiment.

FIG. 2 is a block diagram of a first signal processing unit $10_{m,n}$ of the photodetector 1 according to the embodiment. The M×N first signal processing units $10_{1,1}$ to $10_{M,N}$ respectively have a common arrangement. Each first signal processing unit $10_{m,n}$ includes an integrating circuit 11, a first holding circuit 12, a comparing circuit 13, a second holding circuit 14, and a latching circuit 15. The photodiode $PD_{m,n}$ is also shown in this FIGURE. An anode terminal of the photodiode $PD_{m,n}$ is grounded.

The integrating circuit 11 has an amplifier $A_1$, capacitors $C_{10}$ to $C_{12}$, and switches $SW_{10}$ to $SW_{12}$. The amplifier $A_1$ has its non-inverted input terminal grounded and its inverted input terminal connected to a cathode terminal of the photodiode $PD_{m,n}$. Between the inverted input terminal and an output terminal of the amplifier $A_1$, the switch $SW_{10}$, the capacitor $C_{10}$, the serially connected switch $SW_{11}$ and capacitor $C_{11}$, and the serially connected switch $SW_{12}$ and capacitor $C_{12}$ are connected in parallel.

The capacitors $C_{10}$ to $C_{12}$ and the switches $SW_{11}$ and $SW_{12}$ make up a variable capacitor unit. This variable capacitor unit is selectively set to a capacitance value among capacitance values $C_1$ to $C_3$ as expressed by formulae (1) below. That is, the capacitance value $C_1$ of the variable capacitor unit when both switches $SW_{11}$ and $SW_{12}$ are open is equivalent to the capacitance value of the capacitor $C_{10}$. The capacitance value $C_2$ of the variable capacitor unit when the switch $SW_{11}$ is closed and the switch $SW_{12}$ is open is equivalent to the sum of the respective capacitance values of the capacitors $C_{10}$ and $C_{11}$. The capacitance value $C_3$ of the variable capacitor unit when both switches $SW_{11}$ and $SW_{12}$ are closed is equivalent to the total of the respective capacitance values of the capacitors $C_{10}$ to $C_{13}$.

$$C_1 = C_{10} \tag{1a}$$

$$C_2 = C_{10} + C_{11} \tag{1b}$$

$$C_3 = C_{10} + C_{11} + C_{12} \tag{1c}$$

When the switch $SW_{10}$ is open, the integrating circuit 11 accumulates charges output from the photodiode $PD_{m,n}$ over an accumulating period $T_k$ that is in accordance with the capacitance value $C_k$ set at the variable capacitor unit and then outputs a voltage $V_1$ that is in accordance with the amount of the accumulated charges. With the integrating circuit 11, by the closing of switches $SW_{10}$ to $SW_{12}$, the charges accumulated in the capacitors $C_{10}$ to $C_{12}$ are discharged and the output voltage is initialized. Here, k is an arbitrary integer no less than 1 and no more than 3.

The value of a ratio ($T_k/C_k$) differs according to the value of k. That is, a relationship expressed by a formula (2) indicated below holds among the capacitance values $C_1$ to $C_3$ and the accumulating periods $T_1$ to $T_3$. Preferably, relationships expressed by formulae (3) indicated below also hold among these parameters. Here, each of p and q is an integer no less than 1. More preferably, the accumulating periods $T_1$ to $T_3$ differ mutually and a relationship expressed by a formula (4) indicated below holds among these accumulating periods.

$$\frac{T_1}{C_1} > \frac{T_2}{C_2} > \frac{T_3}{C_3} \qquad (2)$$

$$\frac{T_1}{C_1} = 2^p \frac{T_2}{C_2} \qquad (3a)$$

$$\frac{T_2}{C_2} = 2^q \frac{T_3}{C_3} \qquad (3a)$$

$$T_1 > T_2 > T_3 \qquad (4)$$

The first holding circuit 12 has switches $SW_{21}$ and $SW_{22}$, a capacitor $C_2$, and an amplifier $A_2$. One end of the capacitor $C_2$ is grounded via the switch $SW_{21}$ and is connected to an input terminal of the amplifier $A_2$. The other end of the capacitor $C_2$ is connected via the switch $SW_{22}$ to the output terminal of the amplifier $A_1$ of the integrating circuit 11.

By the respective opening and closing operations of the switches $SW_{21}$ and $SW_{22}$, the first holding circuit 12 holds the voltage $V_1$, output from the integrating circuit 11 in the capacitor $C_2$ at an end of an accumulating period $T_k$ among accumulating periods $T_1$ to $T_3$, inputs the held voltage into the amplifier $A_2$, and outputs a voltage $V_2$ from the amplifier $A_2$. The first holding circuit 12 serves in common as a CDS circuit and can input the voltage $V_1$, output from the integrating circuit 11, and output the output voltage $V_2$, which is in accordance with a difference of the voltages that are respectively input at a start and an end of the accumulating period $T_k$.

The comparing circuit 13 inputs the voltage $V_1$, output from the integrating circuit 11, performs quantitative comparison of this input voltage $V_1$ and a reference voltage $V_{ref}$, and outputs a compared signal $S_3$, expressing the result of comparison, to the latching circuit 15. If the voltage $V_1$, output from the integrating circuit 11 at the end of an accumulating period $T_k$, is less than the reference voltage $V_{ref}$, the comparing circuit 13 instructs the first holding circuit 12 to hold the voltage $V_2$. The latching circuit 15 stores and outputs the compared signal $S_3$ output from the compared circuit 13. The latching circuit 15 is arranged, for example, from parallel registers of the same number of bits as the number of bits of the compared signal $S_3$.

The second holding circuit 14 has a capacitor $C_4$ and switches $SW_{41}$ to $SW_{44}$. One end of the capacitor $C_4$ is connected via the switch $SW_{41}$ to an output terminal of the amplifier $A_2$ of the first holding circuit 12 and is grounded via the switch $SW_{42}$. The other end of the capacitor $C_4$ is grounded via the switch $SW_{43}$ and is connected via the switch $SW_{44}$ to the exterior. By the respective opening and closing operations of the switches $SW_{41}$ to $SW_{44}$, the second holding circuit 14 inputs the voltage $V_2$ output from the first holding circuit 12, holds the voltage at a specific point in time in the capacitor $C_4$, and outputs the held voltage to the exterior. (Actually, because a switched capacitor circuit is connected as shall be described below, charges $Q_4$, the value of which is in accordance with the held voltage, are output to the exterior.)

That is, with the second holding circuit 14, the charges accumulated in the capacitor $C_4$ are discharged by the closing of the switches $SW_{42}$ and $SW_{43}$. The voltage that is input when the switches $SW_{41}$ and $SW_{43}$ are closed and the switch $SW_{42}$ is open is held in the capacitor $C_4$, and when the switches $SW_{41}$ and $SW_{43}$ open, the voltage is kept held as it is in the capacitor $C_4$. When the switches $SW_{44}$ and $SW_{42}$ close, the charges $Q_4$, the value of which is in accordance with the voltage held in the capacitor $C_4$, are output.

Figure 3:
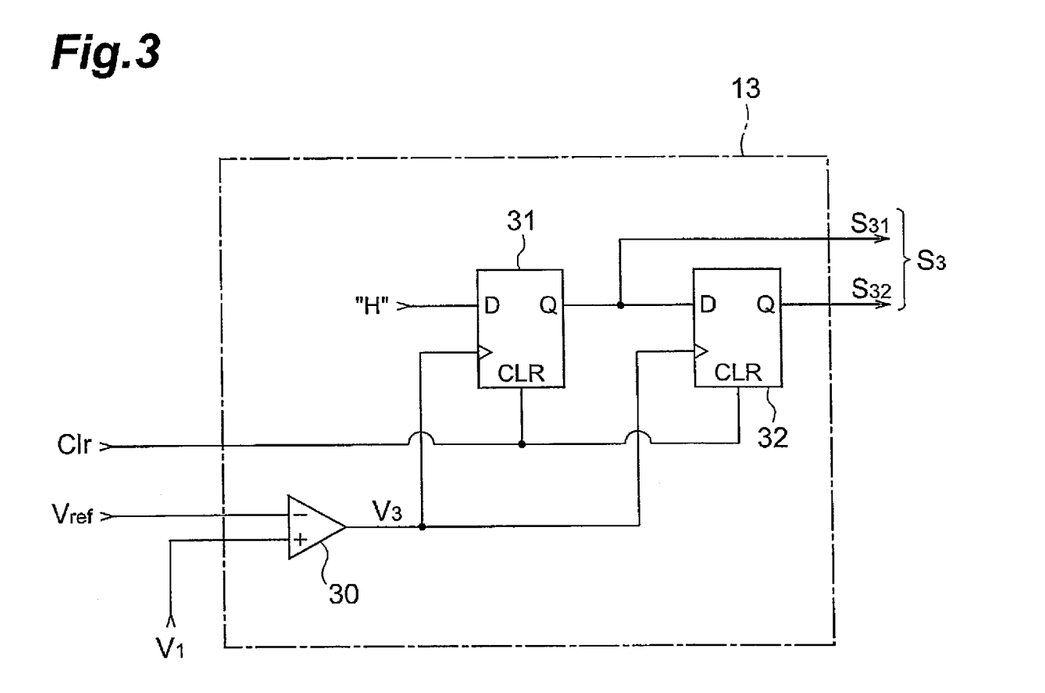
FIG. 3 is a circuit diagram of a comparing circuit 13 of the photodetector 1 according to the embodiment.

FIG. 3 is a circuit diagram of the comparing circuit 13 of the photodetector 1 according to the embodiment. As shown in this FIGURE, the comparing circuit 13 has a comparator 30 and D flip-flops 31 and 32. The comparator 30 inputs the voltage $V_1$, output from the integrating circuit 11, also inputs the reference voltage $V_{ref}$ and performs a quantitative comparison of the voltage $V_1$ and the reference voltage $V_{ref}$. An output level $V_3$ of the comparator 30 is set to a high level if the voltage $V_1$ is greater than the reference voltage $V_{ref}$ and is set to a low level if the voltage $V_1$ is not greater than the reference voltage $V_{ref}$.

With each of the D flip-flops 31 and 32, when a Clr signal that is input into a CLR input terminal is of a high level, an output level from a Q output terminal is of a low level. With each of the D flip-flops 31 and 32, the output voltage $V_3$ from the comparator 30 is input into a clock input terminal, and when this voltage $V_3$ changes from the low level to the high level, the signal level input into a D input terminal up until then is output from the Q output terminal.

The D flip-flops 31 and 32 make up a shift register, and the Q output terminal of the D flip-flop 31 of the preceding stage and the D input terminal of D flip-flop 32 of the subsequent stage are connected to each other. A high level signal is constantly input into the D input terminal of the D flip-flop 31 of the preceding stage. A signal $S_{31}$, output from the Q output terminal of the D flip-flop 31 of the preceding stage, and a signal $S_{32}$, output from the Q output terminal of the D flip-flop 32 of the subsequent stage, make up the 2-bit compared signal $S_3$, output from the comparing circuit 13.

Figure 4:
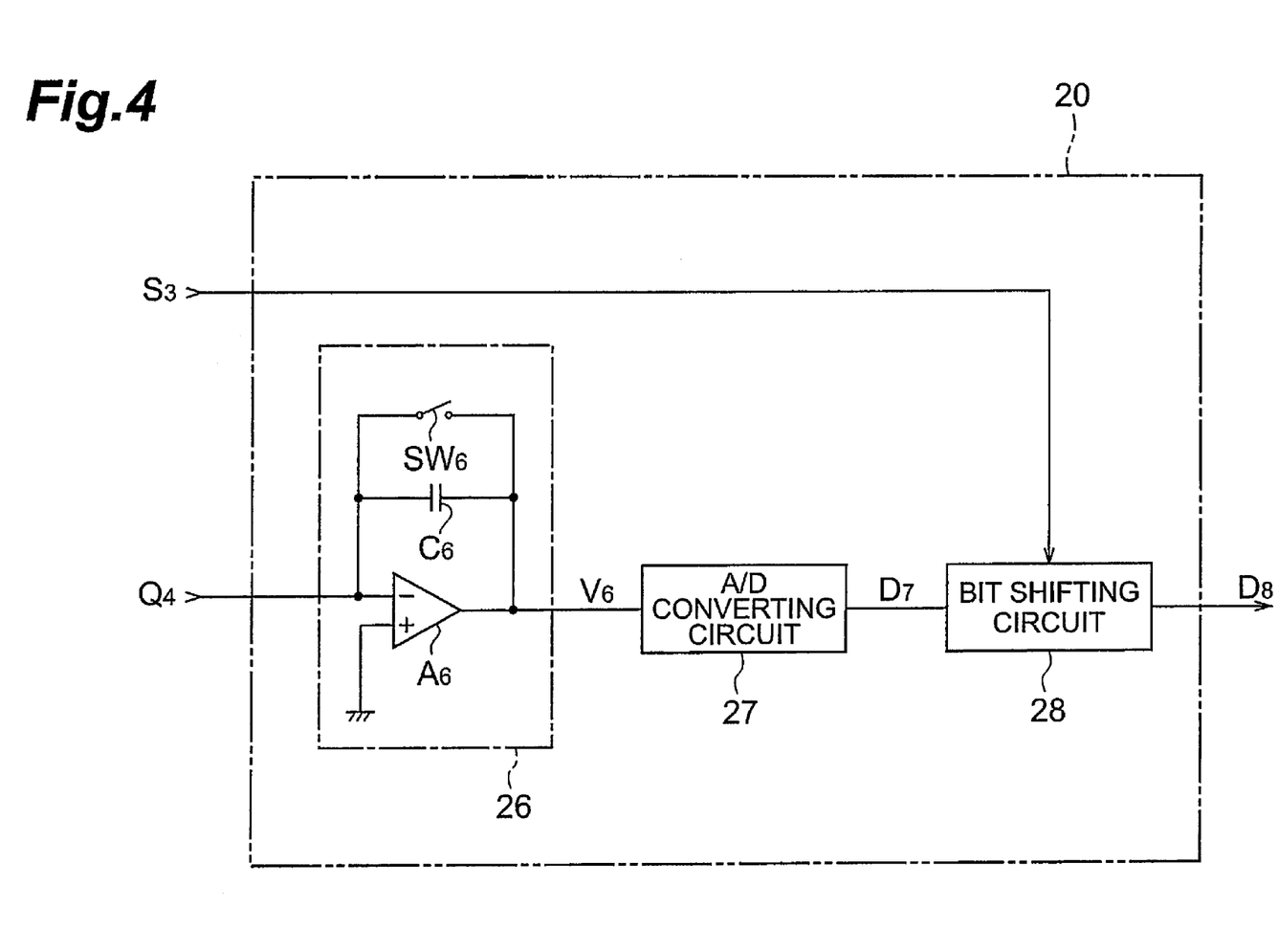
FIG. 4 is a block diagram of a second signal processing unit 20 of the photodetector 1 according to the embodiment.

FIG. 4 is a block diagram of the second signal processing unit 20 of the photodetector 1 according to the embodiment. As shown in this FIGURE, the second signal processing unit 20 includes a switched capacitor circuit 26, an A/D converting circuit 27, and a bit shifting circuit 28.

The switched capacitor circuit 26 has an amplifier $A_6$, a capacitor $C_6$, and a switch $SW_6$. The amplifier $A_6$ has its non-inverted input terminal grounded and its inverted input terminal connected to the switch $SW_{44}$ of the second holding circuit 14. Between the inverted input terminal and an output terminal of the amplifier $A_6$, the switch $SW_6$ and the capacitor $C_6$ are connected in parallel.

When the switch $SW_6$ is open, the switched capacitor circuit 26 inputs the charge value $Q_4$ output from the second holding circuit 14, holds the charge value $Q_4$ in the capacitor $C_6$, and outputs a voltage $V_6$ that is in accordance with the held charge amount to the A/D converting circuit 27. With the switched capacitor circuit 26, by the closing of the switch $SW_6$, the charges accumulated in the capacitor $C_6$ are discharged and the output voltage is initialized.

The A/D converting circuit 27 inputs the voltage $V_6$, output from the second holding circuit 14, held by the switched capacitor circuit 26, and output from the switched capacitor circuit 26, converts this input voltage $V_6$ (analog value) into a digital value, and outputs the digital value $D_7$.

The bit shifting circuit 28 inputs the digital value $D_7$, output from the A/D converting circuit 27, inputs the compared signal $S_3$, output from the comparing circuit 13 and arriving via the latching circuit 15, performs bit shifting of the digital value $D_7$ according to the compared signal $S_3$, and outputs a bit-shifted digital value $D_8$.

Figure 5:
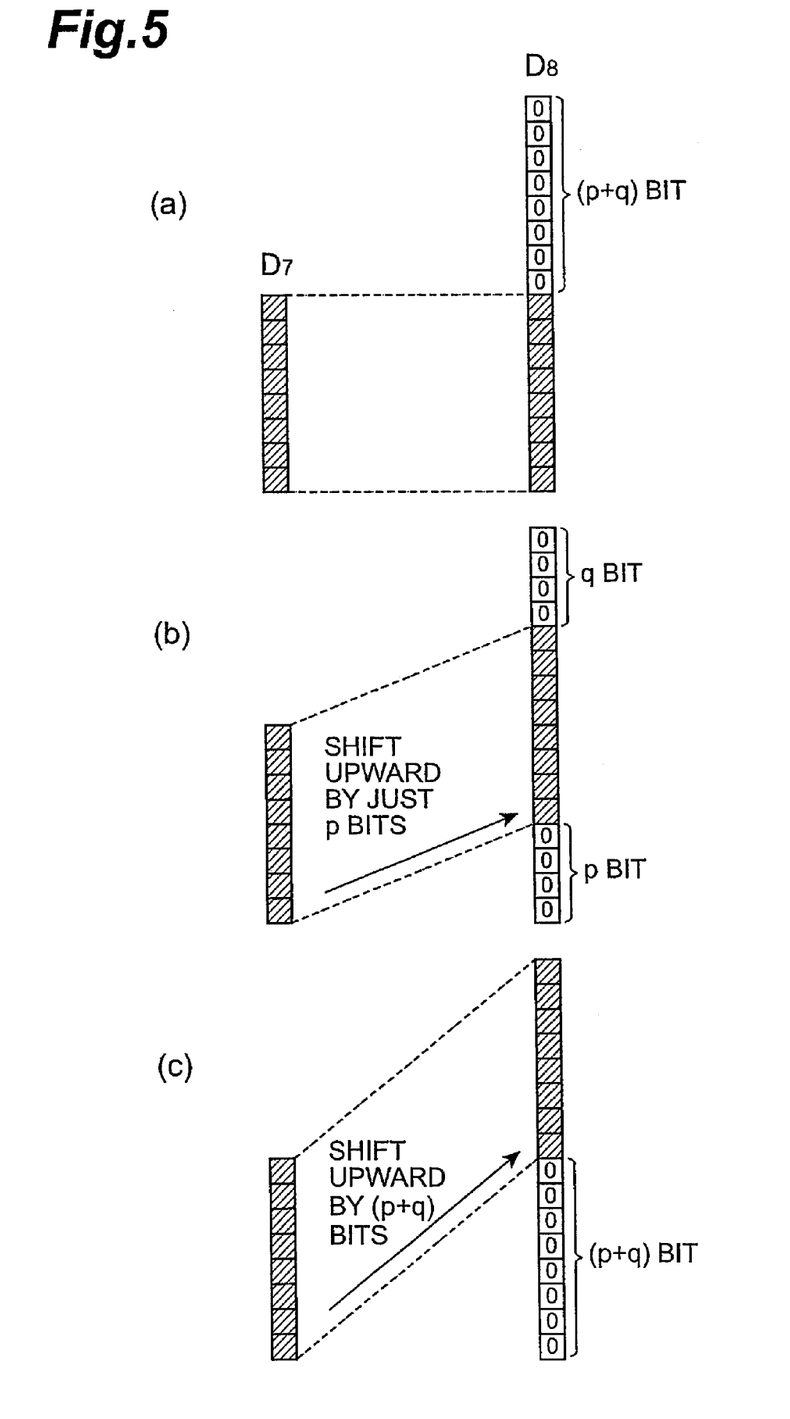
FIG. 5 shows diagrams for describing operations of a bit shifting circuit 28 of the photodetector 1 according to the embodiment.

FIG. 5 shows diagrams for describing operations of the bit shifting circuit 28 of the photodetector 1 according to the embodiment. Each of FIGS. 5A to 5C shows a relationship between the digital value $D_7$, output from the A/D converting circuit 27 and input into the bit shifting circuit 28, and the digital value $D_8$, output from the bit shifting circuit 28. In the following, the voltage $V_1$, output from the integrating circuit 11 at the end of the accumulating period $T_k$ with the variable capacitor unit of the integrating circuit 11 being set to the capacitance value $C_k$, shall be expressed as $V_{1,k}$.

It shall also be deemed that the capacitance values $C_1$ to $C_3$, selectively set in the variable capacitor unit of the integrating circuit 11, and the accumulating periods $T_1$ to $T_3$ satisfy the relationships of the above-described formulae (1) to (3). Here, the number of bits of the output digital value $D_8$ is equal to the result of adding p and q in the formulae (3) to the number of bits of the input digital value $D_7$. Each of p and q is no more than the number of bits of the input digital value $D_7$.

FIG. 5-(a) shows a relationship between the input digital value $D_7$ and the output digital value $D_8$ when the comparing circuit 13 judges that each of voltages $V_{1,1}$ to $V_{1,3}$ is less than the reference voltage $V_{ref}$. In this case, the output digital value $D_8$ is the same in value as the input digital value $D_7$, and the value 0 is placed in each of the upper (p+q) bits.

FIG. 5-(b) shows a relationship between the input digital value $D_7$ and the output digital value $D_8$ when the comparing circuit 13 judges that the voltage $V_{1,1}$ is equal to or greater than the reference voltage $V_{ref}$ and each of the voltages $V_{1,2}$ and $V_{1,3}$ is less than the reference voltage $V_{ref}$. In this case, the output digital value $D_8$ takes on the value obtained by shifting the input digital value $D_7$ upward by just p bits and the value 0 is placed in each of the lower p bits and the upper q bits.

FIG. 5-(c) shows a relationship between the input digital value $D_7$ and the output digital value $D_8$ when the comparing circuit 13 judges that each of the voltages $V_{1,1}$ and $V_{1,2}$ is equal to or greater than the reference voltage $V_{ref}$ and the voltage $V_{1,3}$ is less than the reference voltage $V_{ref}$. In this case, the output digital value $D_8$ takes on the value obtained by shifting the input digital value $D_7$ upward by just (p+q) bits and the value 0 is placed in each of the lower (p+q) bits.

For example, let the digital value $D_7$, output from the A/D converting circuit 27 and input into the bit shifting circuit 28, be an 8-bit data and the value of each of p and q be 4. In this case, the digital value $D_8$, output from the bit shifting circuit 28 is a 16 bit data and the dynamic range thereof is 64 k ($\cong 2^{16}$).

Operations of the photodetector 1 according to the present embodiment shall now be described. The intensity of light incident on each of the M×N photodiodes $PD_{1,1}$ to $PD_{M,N}$ is not uniform in general and differs according to the position (m, n). In the following, a description shall be provided for each of a case where the amount of light incident on the photodiode $PD_{m,n}$ is comparatively low, a case where the amount of light incident on the photodiode $PD_{m,n}$ is of an intermediate level, and a case where the amount of light incident on the photodiode $PD_{m,n}$ is comparatively high. The following operations are carried out based on control signals output from an unillustrated control circuit.

Figure 6:
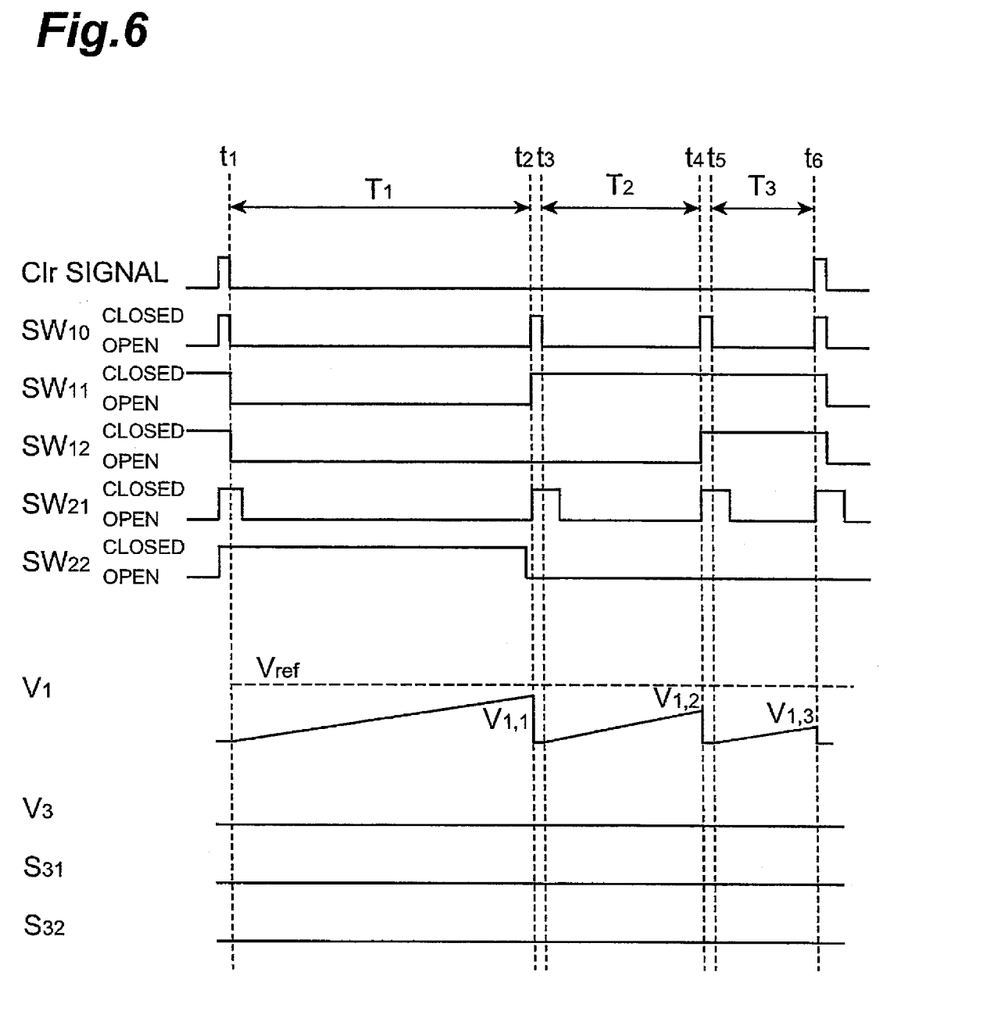
FIG. 6 is a timing chart for describing operations of the photodetector 1 according to the embodiment.
Figure 7:
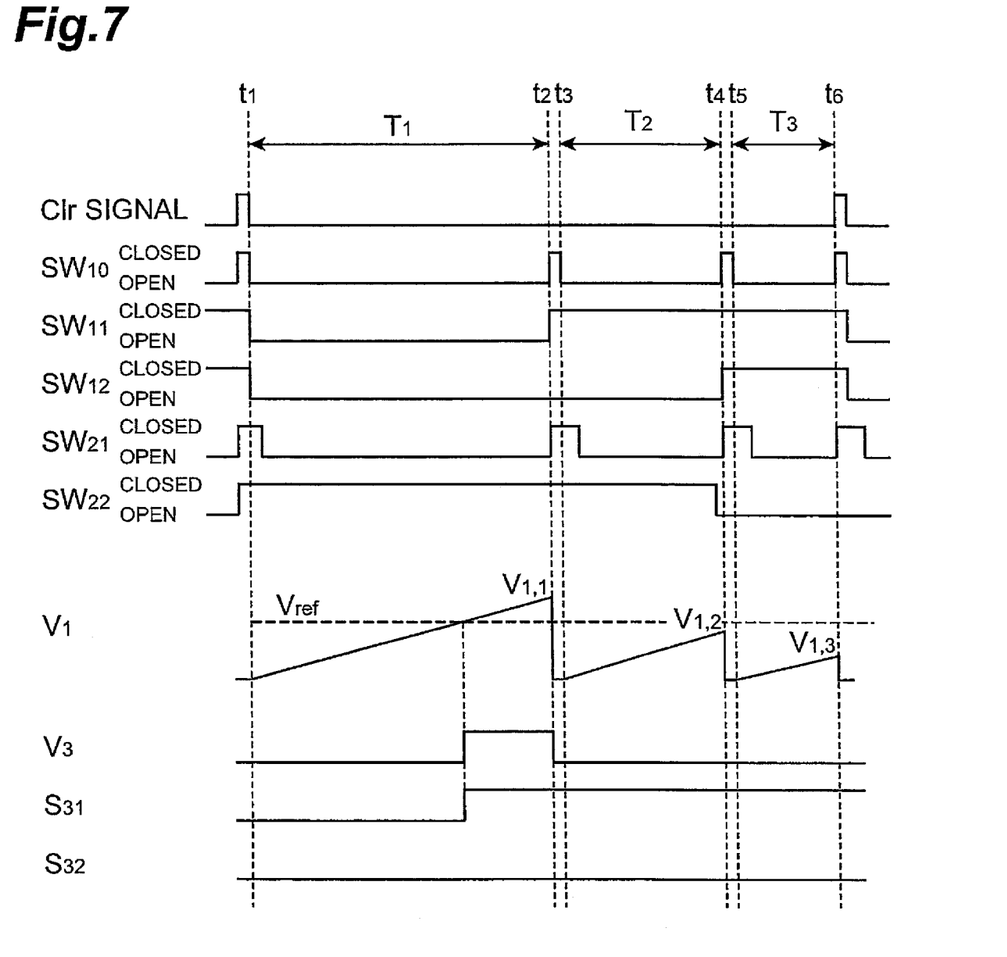
FIG. 7 is a timing chart for describing operations of the photodetector 1 according to the embodiment.
Figure 8:
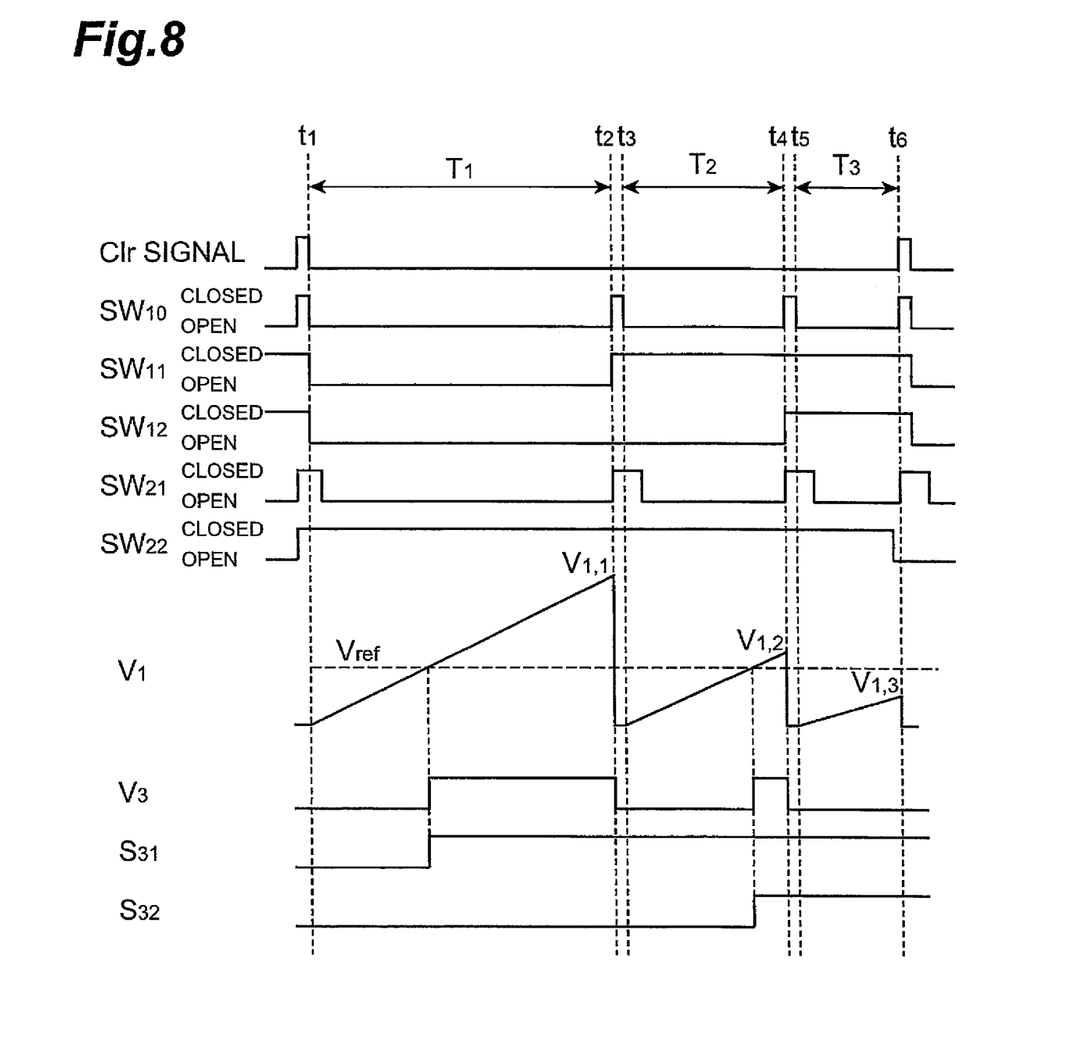
FIG. 8 is a timing chart for describing operations of the photodetector 1 according to the embodiment.

Each of FIG. 6 to FIG. 8 is a timing chart for describing the operations of the photodetector 1 according to the embodiment. FIG. 6 is for describing the operations of the first signal processing unit $10_{m,n}$ when the amount of light incident on the photodiode $PD_{m,n}$ is comparatively low. FIG. 7 is for describing the operations of the first signal processing unit $10_{m,n}$ when the amount of light incident on the photodiode $PD_{m,n}$ is of an intermediate level. FIG. 8 is for describing the operations of the first signal processing unit $10_{m,n}$ when the amount of light incident on the photodiode $PD_{m,n}$ is comparatively high.

In each FIGURE, the level of the Clr signal that is input into the CLR input terminal of each of the D flip-flops 31 and 32 of the comparing circuit 13, the respective opening and closing operations of the switches $SW_{10}$ to $SW_{12}$ of the integrating circuit 11, the respective opening and closing operations of the switches $SW_{21}$ and $SW_{22}$ of the first holding circuit 12, the voltage $V_1$ output from the integrating circuit 11, the output level $V_3$ of the comparator 30 of the comparing circuit 13, and the compared signal $S_3$ ($S_{31}$, $S_{32}$) output from the respective Q output terminals of the D flip-flops 31 and 32 of the comparing circuit 13 are shown in that order from the upper side.

Also, in each FIGURE, the period from a time $t_1$ to a time $t_2$ is the accumulating period $T_1$, the period from a time $t_3$ to a time $t_4$ is the accumulating period $T_2$, and the period from a time $t_5$ to a time $t_6$ is the accumulating period $T_3$.

In all of the cases illustrated in FIG. 6 to FIG. 8, for a fixed period before the time $t_1$, the Clr signal is set to the high level and the signals (that is, the compared signal $S_3$ ($S_{31}$, $S_{32}$)) output from the respective Q output terminals of the D flip-flops 31 and 32 of the comparing circuit 13 are thereby initialized. Also for fixed periods before the time $t_1$, the respective switches $SW_{10}$ to $SW_{12}$ of the integrating circuit 11 are closed to discharge the respective capacitors $C_{10}$ to $C_{12}$ and initialize the voltage $V_1$ output from the integrating circuit 11.

During the accumulating period $T_1$, from the time $t_1$ to the time $t_2$, the switches $SW_{10}$ to $SW_{12}$ of the integrating circuit 11 are opened and the variable capacitor unit of the integrating circuit 11 is set to the capacitance value $C_1$ (the abovementioned formula (1a)). The charges generated at the photodiode $PD_{m,n}$ are accumulated into the variable capacitor unit of the integrating circuit 11 of the first signal processing unit $10_{m,n}$, and the voltage $V_1$ that is in accordance with the amount of the accumulated charges is output from the integrating circuit 11. This voltage $V_1$ increases gradually from the initial value at the time $t_1$.

During the period from the time $t_2$ to the time $t_3$ (that is, the period between the accumulating period $T_1$ and the accumulating period $T_2$), the switches $SW_{10}$ and $SW_{11}$ of the integrating circuit 11 are closed to discharge the capacitors $C_{10}$ and $C_{11}$ and initialize the voltage $V_1$ output from the integrating circuit 11.

During the accumulating period $T_2$, from the time $t_3$ to the time $t_4$, the switch $SW_{10}$ of the integrating circuit 11 is opened, the $SW_{12}$ is kept open, the switch $SW_{11}$ is closed, and the variable capacitor unit of the integrating circuit 11 is thereby set to the capacitance value $C_2$ (the abovementioned formula (1b)). The charges generated at the photodiode $PD_{m,n}$ are accumulated into the variable capacitor unit of the integrating circuit 11 of the first signal processing unit $10_{m,n}$, and the voltage $V_1$ that is in accordance with the amount of the accumulated charges is output from the integrating circuit 11. This voltage $V_1$ increases gradually from the initial value at the time $t_3$.

During the period from the time $t_4$ to the time $t_5$ (that is, the period between the accumulating period $T_2$ and the accumulating period $T_3$), the switches $SW_{10}$, $SW_{11}$, and $SW_{12}$ of the integrating circuit 11 are closed to discharge the capacitors $C_{10}$, $C_{11}$, and $C_{12}$ and initialize the voltage $V_1$ output from the integrating circuit 11.

During the accumulating period $T_3$, from the time $t_5$ to the time $t_6$, the switch $SW_{10}$ of the integrating circuit 11 is opened, the respective switches $SW_{11}$ and $SW_{12}$ are closed, and the variable capacitor unit of the integrating circuit 11 is thereby set to the capacitance value $C_3$ (the abovementioned formula (1c)). The charges generated at the photodiode $PD_{m,n}$ are accumulated into the variable capacitor unit of the integrating circuit 11 of the first signal processing unit $10_{m,n}$, and the voltage $V_1$ that is in accordance with the amount of the accumulated charges is output from the integrating circuit 11. This voltage $V_1$ increases gradually from the initial value at the time $t_5$.

In each of an initial fixed period of the accumulating period $T_1$ (that is, a fixed period immediately after the time $t_1$), an initial fixed period of the accumulating period $T_2$ (that is, a fixed period immediately after the time $t_3$), and an initial fixed period of the accumulating period $T_3$ (that is, a fixed period immediately after the time $t_5$), the switch $SW_{21}$ of the first holding circuit 12 is closed and the voltage $V_2$ output from the first holding circuit 12 is initialized. The switch $SW_{22}$ of the first holding circuit 12 is also closed before the time $t_1$.

The description of the operations up until now applies in common to each of the cases of FIG. 6 to FIG. 8. However, the first signal processing unit $10_{m,n}$ operates differently according to the magnitude of the amount of light incident onto the photodiode $PD_{m,n}$ as shall be described below.

The operations of the first signal processing unit $10_{m,n}$ when the amount of light incident on the photodiode $PD_{m,n}$ is comparatively low are shown in FIG. 6. In this case, each of the voltage $V_{1,1}$ output from the integrating circuit 11 at the end of the accumulating period $T_1$, the voltage $V_{1,2}$ output from the integrating circuit 11 at the end of the accumulating period $T_2$, and the voltage $V_{1,3}$ output from the integrating circuit 11 at the end of the accumulating period $T_3$ is less than the reference voltage $V_{ref}$. Thus in all of the accumulating periods $T_1$ to $T_3$, the output level $V_3$ of the comparator 30 of the comparing circuit 13 stays at the low level, and the signals $S_{31}$ and $S_{32}$ output from the respective Q output terminals of the D flip-flops 31 and 32 stay at the low level.

At the point in time at which the voltage $V_{1,1}$, output from the integrating circuit 11 at the end of the accumulating period $T_1$ (immediately before the time $t_2$), is judged to be less than the reference voltage $V_{ref}$, the switch $SW_{22}$ of the first holding circuit 12, which was closed until then, opens and the switch $SW_{22}$ stays open thereafter. Consequently, the voltage $V_2$ that is output from the first holding circuit 12 from the time $t_2$ onward is in accordance with the difference between the voltage $V_{1,1}$ output from the integrating circuit 11 at the point in time at which the switch $SW_{22}$ became open at the end of the accumulating period $T_1$ and the voltage, output from the integrating circuit 11 at the point in time at which the switch $SW_{21}$ became open at the beginning of the accumulating period $T_1$. Furthermore, this voltage $V_2$ is held by the second holding circuit 14.

The operations of the first signal processing unit $10_{m,n}$ when the amount of light incident on the photodiode $PD_{m,n}$ is of an intermediate level are shown in FIG. 7. In this case, whereas the voltage $V_{1,1}$ output from the integrating circuit 11 at the end of the accumulating period $T_1$ is equal to or greater than the reference voltage $V_{ref}$, each of the voltage $V_{1,2}$ output from the integrating circuit 11 at the end of the accumulating period $T_2$ and the voltage $V_{1,3}$ output from the integrating circuit 11 at the end of the accumulating period $T_3$ is less than the reference voltage $V_{ref}$.

Thus at some point in time within the accumulating period $T_1$ (the point in time at which the output voltage $V_1$ from the integrating circuit 11 becomes equal to or greater than the reference voltage $V_{ref}$), the output level $V_3$ of the comparator 30 of the comparing circuit 13 switches to the high level, and the signal $S_{31}$ output from the Q output terminal of the D flip-flop 31 changes to the high level. From the time $t_2$ onward, the signal $S_{31}$ output from the Q output terminal of the D flip-flop 31 stays at the high level and the signal $S_{32}$ output from the Q output terminal of the D flip-flop 32 stays at the low level.

At the point in time at which the voltage $V_{1,2}$, output from the integrating circuit 11 at the end of the accumulating period $T_2$ (immediately before the time $t_4$), is judged to be less than the reference voltage $V_{ref}$, the switch $SW_{22}$ of the first holding circuit 12, which was closed until then, opens and the switch $SW_{22}$ stays open thereafter. Consequently, the voltage $V_2$ that is output from the first holding circuit 12 from the time $t_4$ onward is in accordance with the difference between the voltage $V_{1,2}$, output from the integrating circuit 11 at the point in time at which the switch $SW_{22}$ became open at the end of the accumulating period $T_2$, and the voltage, output from the integrating circuit 11 at the point in time at which the switch $SW_{21}$ became open at the beginning of the accumulating period $T_2$. Furthermore, this voltage $V_2$ is held by the second holding circuit 14.

The operations of the first signal processing unit $10_{m,n}$ when the amount of light incident on the photodiode $PD_{m,n}$ is comparatively high are shown in FIG. 8. In this case, whereas each of the voltage $V_{1,1}$ output from the integrating circuit 11 at the end of the accumulating period $T_1$ and the voltage $V_{1,2}$ output from the integrating circuit 11 at the end of the accumulating period $T_2$ is equal to or greater than the reference voltage $V_{ref}$, the voltage $V_{1,3}$ output from the integrating circuit 11 at the end of the accumulating period $T_3$ is less than the reference voltage $V_{ref}$.

Thus at some point in time within the accumulating period $T_1$ (the time at which the output voltage $V_1$ from the integrating circuit 11 becomes equal to or greater than the reference voltage $V_{ref}$), the output level $V_3$ of the comparator 30 of the comparing circuit 13 switches to the high level, and the signal $S_{31}$ output from the Q output terminal of the D flip-flop 31 changes to the high level. Furthermore, at some time within the accumulating period $T_2$ (the time at which the output voltage $V_1$ from the integrating circuit 11 becomes equal to or greater than the reference voltage $V_{ref}$), the output level $V_3$ of the comparator 30 of the comparing circuit 13 switches to the high level, and the signal $S_{32}$ output from the Q output terminal of the D flip-flop 32 also changes to the high level. From the time $t_4$ onwards, the signals $S_{31}$ and $S_{32}$ output from the respective Q output terminals of the D flip-flops 31 and 32 stay at the high level.

At the point in time at which the voltage $V_{1,3}$, output from the integrating circuit 11 at the end of the accumulating period $T_3$ (immediately before the time $t_6$), is judged to be less than the reference voltage $V_{ref}$, the switch $SW_{22}$ of the first holding circuit 12, which was closed until then, opens and the switch $SW_{22}$ stays open thereafter. Consequently, the voltage $V_2$ that is output from the first holding circuit 12 from the time $t_6$ onward is in accordance with the difference between the voltage $V_{1,3}$, output from the integrating circuit 11 at the point in time at which the switch $SW_{22}$ became open at the end of the accumulating period $T_3$, and the voltage, output from the integrating circuit 11 at the point in time at which the switch $SW_{21}$ became open at the beginning of the accumulating period $T_3$. Furthermore, this voltage $V_2$ is held by the second holding circuit 14.

The compared signal $S_3$ ($S_{31}$, $S_{32}$), output from the comparing circuit 13 at time $t_6$ onward, expresses the level of the amount of light incident on the photodiode $PD_{m,n}$ in three stages.

That the compared signal $S_3$ ($S_{31}$, $S_{32}$) is (0, 0) thus signifies that even if charges generated at the photodiode $PD_{m,n}$ are accumulated into the variable capacitor unit over the accumulating period $T_1$ with the variable capacitor unit of the integrating circuit 11 being set to the capacitance value $C_1$, the output voltage $V_{1,1}$ at the end of the accumulating period $T_1$ is less than the reference voltage $V_{ref}$, in other words, the amount of light incident on the photodiode $PD_{m,n}$ is comparatively low.

That the compared signal $S_3$ ($S_{31}$, $S_{32}$) is (1, 0) signifies that though the output voltage $V_{1,1}$ at the end of the accumulating period $T_1$ is equal to or greater than the reference voltage $V_{ref}$, even if charges generated at the photodiode $PD_{m,n}$ are accumulated into the variable capacitor unit over the accumulating period $T_2$ with the variable capacitor unit of the integrating circuit 11 being set to the capacitance value $C_2$, the output voltage $V_{1,2}$ at the end of the accumulating period $T_2$ is less than the reference voltage $V_{ref}$, in other words, the amount of light incident on the photodiode $PD_{m,n}$ is of an intermediate level.

That the compared signal $S_3$ ($S_{31}$, $S_{32}$) is (1, 1) signifies that though the output voltage $V_{1,2}$ at the end of the accumulating period $T_2$ is equal to or greater than the reference voltage $V_{ref}$, even if charges generated at the photodiode $PD_{m,n}$ are accumulated into the variable capacitor unit over the accumulating period $T_3$ with the variable capacitor unit of the integrating circuit 11 being set to the capacitance value $C_3$, the output voltage $V_{1,3}$ at the end of the accumulating period $T_3$ is less than the reference voltage $V_{ref}$, in other words, the amount of light incident on the photodiode $PD_{m,n}$ is comparatively high.

The voltages respectively held in the first holding circuit 12 and the second holding circuit 14 at time $t_6$ and onward correspond to being the voltage, among the voltages $V_{1,1}$ to $V_{1,3}$ output from the integrating circuit 11 at the respective ends of the accumulating periods $T_1$ to $T_3$, that first became less than the reference voltage $V_{ref}$.

Onward from time $t_6$, the charges $Q_4$ are output successively from the respective second holding circuits 14 of the M×N first signal processing units $10_{1,1}$ to $10_{M,N}$ to the switched capacitor circuit 26, and the compared signal $S_3$ is output from the latching circuit 15 to the bit shifting circuit 28.

At the switched capacitor circuit 26, the charges $Q_4$ that have been successively output from the second holding circuit 14 of each first signal processing unit $10_{m,n}$ are input, these charges $Q_4$ are held in the capacitor $C_6$, and the voltage $V_6$ that is in accordance with the amount of charges held is output to the A/D converting circuit 27. At the A/D converting circuit 27, the voltage $V_6$ output from the switched capacitor circuit 26 is input, this voltage $V_6$ (analog value) is converted into a digital value, and this digital value $D_7$ is output.

The digital value $D_7$ output from the A/D converting circuit 27 and the compared signal $S_3$ output from the comparing circuit 13 are input into the bit shifting circuit 28. The digital value $D_7$ is then bit shifted based on the compared signal $S_3$, and the bit-shifted digital value $D_8$ is output. Here, if the compared signal $S_3$ ($S_{31}$, $S_{32}$) is (0,0), the output digital value $D_8$ is the same in value as the input digital value $D_7$, and the value 0 is placed in each of the upper (p+q) bits (FIG. 5-(a)).

If the compared signal $S_3$ ($S_{31}$, $S_{32}$) is (1,0), the output digital value $D_8$ takes on the value obtained by shifting the input digital value $D_7$ upward by just p bits and the value 0 is placed in each of the lower p bits and the upper q bits (FIG. 5-(a)). If the compared signal $S_3$ ($S_{31}$, $S_{32}$) is (1,1), the output digital value $D_8$ takes on the value obtained by shifting the input digital value $D_7$ upward by just (p+q) bits and the value 0 is placed in each of the lower (p+q) bits (FIG. 5-(c)).

Data ($V_2$, $S_3$), concerning the amount of light incident on the photodiode $PD_{m,n}$ in the period from the time $t_1$ to the time $t_6$, are thus held in the second holding circuit 14 and the latching circuit 15 of the corresponding first signal processing unit $10_{m,n}$. In this state, the relationships of the above-described formula (2) or (3) hold for the capacitance value $C_k$ of the variable capacitor unit of the integrating circuit 11 and the accumulating period $T_k$, the voltage $V_2$ is held by the second holding circuit 14 when the voltage $V_1$, which is in accordance with the amount of charges accumulated in the variable capacitor unit of the integrating circuit 11 in one of the accumulating periods, is less than the reference voltage $V_{ref}$, and the compared signal $S_3$, expressing the accumulating period at which the held voltage $V_2$ is obtained, is stored by the loatching circuit 15.

Then based on the data ($Q_4$, $S_3$), output from the second holding circuit 14 and the latching circuit 15 of each first signal processing unit $10_{m,n}$ from the subsequent time $t_6$ onward, the voltage, which is in accordance with the charges $Q_4$ and results from the conversion by the switched capacitor circuit 26, is A/D converted by the A/D converting circuit 27 of the second signal processing unit 20, and the digital value is bit shifted as necessary by the bit shifting circuit 28.

This photodetector 1 is thus wide in the dynamic range of incident light amount detection. Also because the charges generated at the photodiode $PD_{m,n}$ is accumulated in the capacitor of the integrating circuit 11 and the voltage $V_1$ that is in accordance with the amount of the accumulated charges is output from the integrating circuit 11, the temperature dependence of the incident light amount detection is small.

Also, by the provision of the second holding circuit 14 and the latching circuit 15, in the same period, from the time $t_6$ onward, in which the image pickup data ($V_2$, $S_3$), obtained by the respective photodiodes $PD_{m,n}$ and the respective first signal processing units $10_{m,n}$ in the period from the time $t_1$ to the time $t_6$, are processed at the second signal processing unit 20, the subsequent set of image pickup data ($V_2$, $S_3$) are obtained by the respective photodiodes $PD_{m,n}$ and the respective first signal processing units $10_{m,n}$. The photodetector 1 can thus perform high-speed image pickup.

Also because the first holding circuit 12 serves in common as a CDS circuit, the error of the output voltage $V_1$ due to noise generated during resetting of the amplifier $A_1$ of the integrating circuit 11 is reduced, and the photodetector 1 can thus obtain more accurate image pickup data.

The present invention is not restricted to the above-described embodiment and may be modified in various ways. For example, though with the above-described embodiment, the comparing circuit 13 performs quantitative comparison of the voltage $V_1$ output from the integrating circuit 11 with the reference voltage $V_{ref}$, quantitative comparison of the voltage $V_2$ output from the first holding circuit 12 with the reference voltage $V_{ref}$ may be performed instead.

Also, the circuit arrangement of the photodetector is not restricted to that described with the embodiment above and may take on other forms. For example, the photodiodes are not restricted to a two-dimensional array and may be arrayed one-dimensionally or may be a single photodiode. The capacitance value of the variable capacitor unit of the integrating circuit may be switchable in two stages or four or more stages. Other circuit arrangements are possible for the first holding circuit, the comparing circuit, the second holding circuit, etc., as well. Also, a single first signal processing unit may be provided for a plurality of photodiodes.

INDUSTRIAL APPLICABILITY

The present invention can be used in a photodetector.

The invention claimed is:

1. A photodetector comprising:
    a photodiode, generating charges of an amount that is in accordance with an incident light amount;
    an integrating circuit, having a variable capacitor unit that is selectively set to a capacitance value $C_n$ among K capacitance values $C_1$ to $C_K$, accumulating charges, output from the photodiode, into the variable capacitor unit over an accumulating period $T_k$ that is in accordance with a capacitance value $C_k$ set in the variable capacitor unit, and outputting a voltage according to the amount of the accumulated charges;
    a first holding circuit, holding the voltage output from the integrating circuit at the end of an accumulating period $T_k$ among accumulating periods $T_1$ to $T_K$ and outputting the held voltage; and
    a comparing circuit, inputting the voltage output from the integrating circuit or the first holding circuit, performing a quantitative comparison of the input voltage with a reference voltage, outputting a compared signal expressing the comparing result, and, when the voltage output from the integrating circuit or the first holding circuit at the end of an accumulating period $T_k$ is less than the reference voltage, instructing the first holding circuit to hold the voltage; wherein
    the value of a ratio, $(T_k/C_k)$, differs according to the value of k (where K is an integer no less than 2 and k is an arbitrary integer no less than 1 and no more than K).

2. The photodetector according to claim 1, wherein a ratio of a ratio $(T_{k1}/C_{k1})$ with respect to a ratio $(T_{k2}/C_{k2})$ is a power of 2 (where each of k1 and k2 is an arbitrary integer no less than 1 and no more than K, and k1≠k2).

3. The photodetector according to claim 1, wherein the first holding circuit serves in common as a CDS circuit that inputs the voltage output from the integrating circuit and holds and outputs a voltage that is in accordance with the difference of the voltages that are input at a beginning and an end of the accumulating period $T_k$.

4. The photodetector according to claim 1, further comprising:
    a second holding circuit, inputting a voltage output from the first holding circuit, holding the voltage at a specific point in time, and outputting the held voltage; and
    a latching circuit, inputting a compared signal output from the comparing circuit, storing the compared signal at the specific point in time, and outputting the stored compared signal.

5. The photodetector according to claim 1, further comprising: an A/D converting circuit, inputting the voltage output from the first holding circuit, converting the input voltage into a digital value, and outputting the digital value.

6. The photodetector according to claim 5, further comprising: a bit shifting circuit, inputting the digital value output from the A/D converting circuit, inputting the compared signal output from the comparing circuit, bit shifting the digital value based on the compared signal, and outputting the bit-shifted digital value.

7. The photodetector according to claim 5, further comprising: a switched capacitor circuit, inputting the voltage output from the first holding circuit, holding the voltage in a capacitor unit, and outputting the held voltage to the A/D converting circuit.

8. The photodetector according to claim 5, comprising a plurality of sets of the photodiode, the integrating circuit, the first holding circuit, and the comparing circuit and has a single the A/D converting circuit for the plurality of sets.

* * * * *